US012732947B2

(12) United States Patent
Keating et al.

(10) Patent No.: US 12,732,947 B2
(45) Date of Patent: *Sep. 8, 2026

(54) METHOD FOR IDENTIFYING SIDELINK POSITIONING SYNCHRONIZATION SOURCES

(71) Applicant: Nokia Technologies Oy, Espoo (FI)

(72) Inventors: Ryan Keating, Naperville, IL (US); Hyun-Su Cha, Naperville, IL (US)

(73) Assignee: Nokia Technologies Oy, Espoo (FI)

( * ) Notice: Subject to any disclaimer, the term of this patent is extended or adjusted under 35 U.S.C. 154(b) by 0 days.

This patent is subject to a terminal disclaimer.

(21) Appl. No.: 19/083,014

(22) Filed: Jul. 10, 2025

(65) Prior Publication Data

US 2025/0374225 A1 Dec. 4, 2025

Related U.S. Application Data

(63) Continuation of application No. 18/997,157, filed as application No. PCT/FI2023/050268 on May 15, 2023.

(30) Foreign Application Priority Data

Aug. 10, 2022 (FI) ..................................... 20225713

(51) Int. Cl.
*H04W 64/00* (2009.01)
*H04W 72/25* (2023.01)

(52) U.S. Cl.
CPC ........... *H04W 64/00* (2013.01); *H04W 72/25* (2023.01)

(58) Field of Classification Search
CPC .............................. H04W 64/00; H04W 72/25
See application file for complete search history.

(56) References Cited

U.S. PATENT DOCUMENTS

2020/0053683 A1 2/2020 Gulati et al.
2021/0051613 A1* 2/2021 Tang .................. H04W 56/001
2022/0015056 A1 1/2022 Choi et al.
(Continued)

FOREIGN PATENT DOCUMENTS

WO 2022/032609 A1 2/2022
WO 2022/155262 A1 7/2022

OTHER PUBLICATIONS

"3rd Generation Partnership Project; Technical Specification Group Radio Access Network; NR; Physical layer procedures for data (Release 17)", 3GPP TS 38.214, V17.1.0, Mar. 2022, pp. 1-225.
"3rd Generation Partnership Project; Technical Specification Group Radio Access Network; LTE Positioning Protocol (LPP) (Release 17)", 3GPP TS 37.355, V17.0.0, Jun. 2022, pp. 1-345.
(Continued)

*Primary Examiner* — Barry W Taylor
(74) *Attorney, Agent, or Firm* — Nokia Technologies Oy

(57) ABSTRACT

A terminal device including at least one processor; and at least one memory including computer program code; wherein the at least one memory and the computer program code are configured to, with the at least one processor, cause the terminal device at least to: receive, from a plurality of supporting terminal devices, information indicative of corresponding sidelink synchronization sources to which each of the plurality of supporting terminal devices is synchronized; and obtain a position of the terminal device, which is based on the indicated information of the corresponding sidelink synchronization sources.

14 Claims, 11 Drawing Sheets

(56) References Cited

U.S. PATENT DOCUMENTS

| | | | | |
|---|---|---|---|---|
| 2023/0296752 | A1* | 9/2023 | Thomas | G01S 5/0072 342/125 |
| 2023/0362846 | A1* | 11/2023 | Dutta | H04W 56/001 |
| 2024/0056997 | A1* | 2/2024 | Hoang | H04W 64/00 |
| 2025/0024305 | A1* | 1/2025 | Manolakos | H04W 56/001 |
| 2025/0048407 | A1* | 2/2025 | Yue | H04L 5/0048 |
| 2025/0097878 | A1* | 3/2025 | Tandalam | H04W 56/0015 |
| 2025/0159645 | A1* | 5/2025 | Manolakos | H04W 64/00 |
| 2025/0203572 | A1* | 6/2025 | Thomas | H04W 76/14 |
| 2025/0220633 | A1* | 7/2025 | Li | H04W 64/003 |
| 2025/0267737 | A1* | 8/2025 | Hoang | H04L 5/0037 |

OTHER PUBLICATIONS

"Revised SID on Study on expanded and improved NR positioning", 3GPP TSG RAN Meeting #94e, RP-213588, Agenda Item: 8.6.1, Intel, Dec. 6-17, 2021, 5 pages.
Office action received for corresponding Finnish Application No. 20225713, dated Dec. 14, 2022, 9 pages.
"Potential Solutions for Sidelink Positioning", 3GPP TSG RAN WG1 #109-e, R1-2205038, Agenda Item: 9.5.1.3, Qualcomm Incorporated, May 9-20, 2022, pp. 1-11.
Office action received for corresponding Finnish Application No. 20225713, dated Jun. 14, 2023, 6 pages.
International Search Report and Written Opinion received for corresponding Patent Cooperation Treaty Application No. PCT/FI2023/050268, dated Aug. 17, 2023, 16 pages.

* cited by examiner

600

| mapping | between which sources | synch offset |
| --- | --- | --- |
| mapping 1 | gNB_1 and gNB_2 | d_1 |
| mapping 2 | gNB_1 and gNB_3 | d_2 |
| mapping 3 | gNB_2 and gNB_3 | d_3 |
| mapping 4 | gNB_2 and gNB_1 | -d_1 |
| mapping 5 | gNB_3 and gNB_1 | -d_2 |
| mapping 6 | gNB_3 and gNB_2 | -d_3 |
| mapping 7 | cell 1 and cell 2 | d_4 |
| mapping 8 | TRP 1 and TRP 2 | d_4 |

| mapping | supporting UE | synch source |
| --- | --- | --- |
| mapping 1 | UE_1 | gNB_1 |
| mapping 2 | UE_2 | gNB_2 |
| mapping 3 | UE_3 | gNB_3 |
| mapping 4 | UE_4 | cell 1 |
| mapping 5 | UE_5 | cell 2 |
| mapping 6 | UE_6 | TRP 1 |
| mapping 7 | UE_7 | TRP 2 |

| mapping | Sync ID | synch source |
|---|---|---|
| mapping 1 | 1A | gNB_1 |
| mapping 2 | 1B | gNB_2 |
| mapping 3 | 1C | gNB_3 |
| mapping 4 | 1D | cell 1 |
| mapping 5 | 1E | cell 2 |
| mapping 6 | 1F | TRP 1 |
| mapping 7 | 1G | TRP 2 |

| mapping | SL PRS signal | synch offset |
|---|---|---|
| mapping 1 | 1A | d_1 |
| mapping 2 | 1B | d_2 |
| mapping 3 | 1C | d_3 |

| mapping | SL PRS ID | PCI |
|---|---|---|
| mapping 1 | 1A | 2A |
| mapping 2 | 1B | 2B |
| mapping 3 | 1C | 2C |

FIG. 6E

METHOD FOR IDENTIFYING SIDELINK POSITIONING SYNCHRONIZATION SOURCES

RELATED APPLICATION

This application is co-pending with U.S. application Ser. No. 18/997,157, filed on Jan. 20, 2025, which claims priority to PCT Patent Application No. PCT/FI2023/050268, filed 15 May 2023, which claims priority from Finland Application No. 20225713, filed on 10 Aug. 2022, which is incorporated herein by reference in its entirety.

TECHNICAL FIELD

The examples and non-limiting example embodiments relate generally to communications and, more particularly, to a method for identifying sidelink positioning synchronization sources.

BACKGROUND

It is known for a pair of user equipment to communicate over a sidelink in a communication network.

SUMMARY

In accordance with an aspect, a terminal device includes at least one processor; and at least one memory including computer program code; wherein the at least one memory and the computer program code are configured to, with the at least one processor, cause the terminal device at least to: receive, from a plurality of supporting terminal devices, information indicative of corresponding sidelink synchronization sources to which each of the plurality of supporting terminal devices is synchronized; and obtain a position of the terminal device, which is based on the indicated information of the corresponding sidelink synchronization sources.

In accordance with an aspect, a terminal device includes at least one processor; and at least one memory including computer program code; wherein the at least one memory and the computer program code are configured to, with the at least one processor, cause a terminal device at least to: indicate, to a target terminal device of a sidelink synchronization source to which the terminal device is synchronized; and transmit, to the target terminal device, a sidelink position reference signal to enable a determination of a position of the target terminal device, which is based on the sidelink position reference signal and the sidelink synchronization source. In another aspect, the terminal device and the target terminal device may be different devices in a radio network.

In accordance with an aspect, a location management entity includes at least one processor; and at least one memory including computer program code; wherein the at least one memory and the computer program code are configured to, with the at least one processor, cause the location management entity at least to: receive, from a plurality of supporting terminal devices, information indicative of corresponding sidelink synchronization sources to which each of the plurality of supporting terminal devices is synchronized; and support positioning determination of a target terminal device using the indicated information.

In accordance with an aspect, a method of determining a position of a terminal device is provided, the method including performing by a terminal device, steps may include: receiving, from a plurality of supporting terminal devices, information indicative of corresponding sidelink synchronization sources to which each of the plurality of supporting terminal devices is synchronized; and obtaining, a position of the terminal device, which is based on the indicated information of the corresponding sidelink synchronization sources.

In accordance with an aspect, a method of determining a position of a target terminal device is provided, the method including performing by a terminal device, steps may include: indicating, to a target terminal device of a sidelink synchronization source to which the terminal device is synchronized; and transmitting, to the target terminal device, a sidelink position reference signal to enable a determination of a position of the target terminal device, which is based on the sidelink position reference signal and the sidelink synchronization source. In another aspect, the terminal device and the target terminal device may be different devices in a radio network In accordance with an aspect, a method of determining a position of a target terminal device is provided, the method including performing by a location management entity, steps may include: receiving, from a plurality of supporting terminal devices, information indicative of corresponding sidelink synchronization sources to which each of the plurality of supporting terminal devices is synchronized; and supporting positioning determination of a target terminal device using the indicated information.

In accordance with an aspect, a terminal device includes means for receiving, from a plurality of supporting terminal devices, information indicative of corresponding sidelink synchronization sources to which each of the plurality of supporting terminal devices is synchronized; and means for obtaining, a position of the terminal device, which is based on the indicated information of the corresponding sidelink synchronization sources.

In accordance with an aspect, a terminal device includes means for indicating, to a target terminal device of a sidelink synchronization source to which the terminal device is synchronized; and means for transmitting, to the target terminal device, a sidelink position reference signal to enable a determination of a position of the target terminal device, which is based on the sidelink position reference signal and the sidelink synchronization source.

In accordance with an aspect, a location management entity includes means for receiving, from a plurality of supporting terminal devices, information indicative of corresponding sidelink synchronization sources to which each of the plurality of supporting terminal devices is synchronized; and means for supporting positioning determination of a target terminal device using the indicated information.

BRIEF DESCRIPTION OF THE DRAWINGS

The foregoing aspects and other features are explained in the following description, taken in connection with the accompanying drawings.

FIG. 6A shows an example mapping to synchronization offsets.

FIG. 6B shows an example mapping of supporting UEs to synchronization sources.

FIG. 6C shows an example mapping of synchronization IDs to synchronization sources.

FIG. 6D shows an example mapping between S-UE SL PRS signals and synchronization offsets.

FIG. 6E shows an example mapping between SL PRS IDs and PCIs.

DETAILED DESCRIPTION OF EXAMPLE EMBODIMENTS

Figure 1:
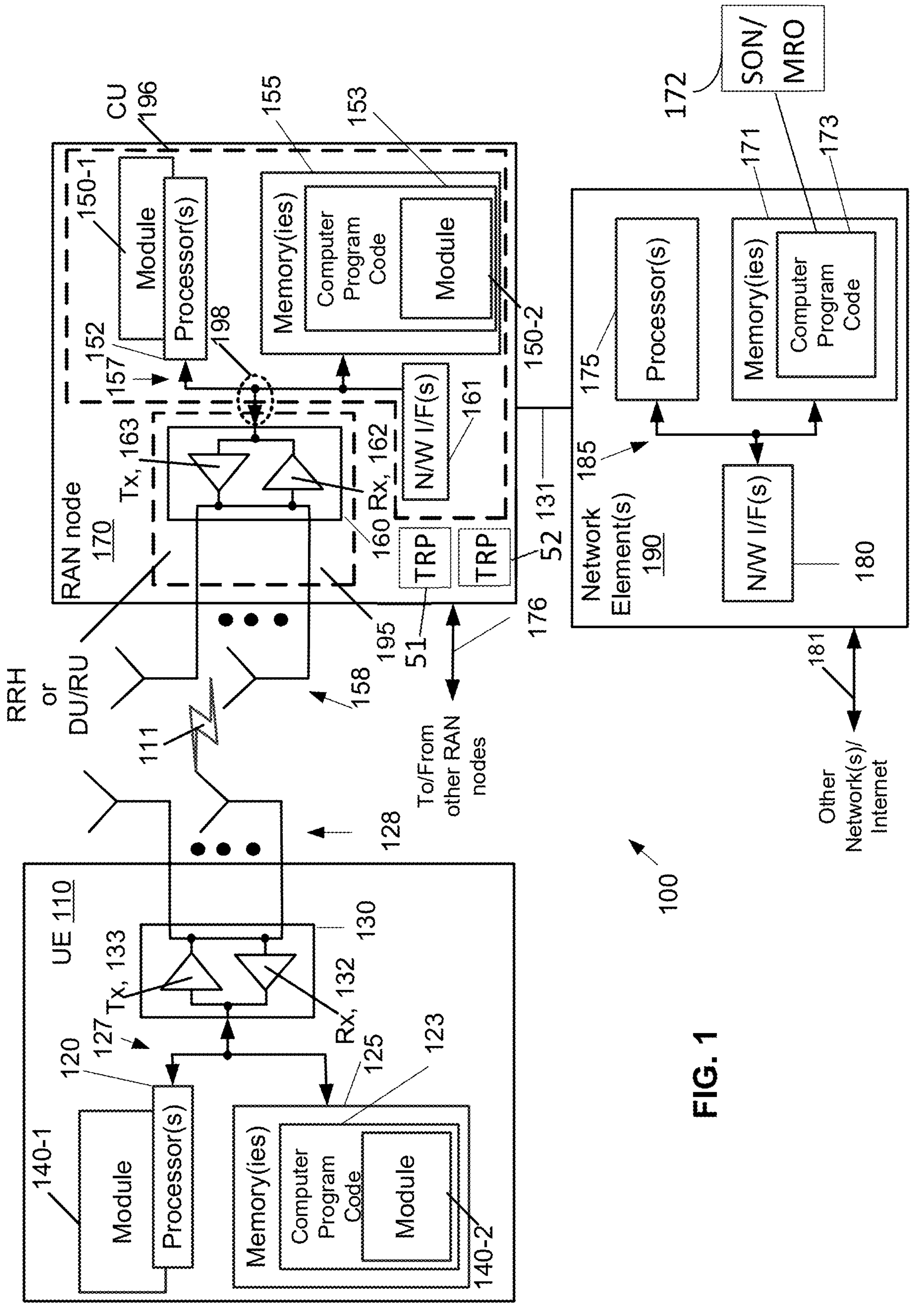
FIG. 1 is a block diagram of one possible and non-limiting system in which the example embodiments may be practiced.

Turning to FIG. 1, this figure shows a block diagram of one possible and non-limiting example in which the examples may be practiced. A user equipment (UE) 110, radio access network (RAN) node 170, and network element(s) 190 are illustrated. In the example of FIG. 1, the user equipment (UE) 110 is in wireless communication with a wireless network 100. A UE is a wireless device that can access the wireless network 100. The UE 110 includes one or more processors 120, one or more memories 125, and one or more transceivers 130 interconnected through one or more buses 127. Each of the one or more transceivers 130 includes a receiver, Rx, 132 and a transmitter, Tx, 133. The one or more buses 127 may be address, data, or control buses, and may include any interconnection mechanism, such as a series of lines on a motherboard or integrated circuit, fiber optics or other optical communication equipment, and the like. The one or more transceivers 130 are connected to one or more antennas 128. The one or more memories 125 include computer program code 123. The UE 110 includes a module 140, may include one of or both parts 140-1 and/or 140-2, which may be implemented in a number of ways. The module 140 may be implemented in hardware as module 140-1, such as being implemented as part of the one or more processors 120. The module 140-1 may be implemented also as an integrated circuit or through other hardware such as a programmable gate array. In another example, the module 140 may be implemented as module 140-2, which is implemented as computer program code 123 and is executed by the one or more processors 120. For instance, the one or more memories 125 and the computer program code 123 may be configured to, with the one or more processors 120, cause the user equipment 110 to perform one or more of the operations as described herein. The UE 110 communicates with RAN node 170 via a wireless link 111.

The RAN node 170 in this example is a base station that provides access for wireless devices such as the UE 110 to the wireless network 100. The RAN node 170 may be, for example, a base station for 5G, also called New Radio (NR). In 5G, the RAN node 170 may be a NG-RAN node, which is defined as either a gNB or an ng-eNB. A gNB is a node providing NR user plane and control plane protocol terminations towards the UE, and connected via the NG interface (such as connection 131) to a 5GC (such as, for example, the network element(s) 190). The ng-eNB is a node providing E-UTRA user plane and control plane protocol terminations towards the UE, and connected via the NG interface (such as connection 131) to the 5GC. The NG-RAN node may include multiple gNBs, which may also include a central unit (CU) (gNB-CU) 196 and distributed unit(s) (DUs) (gNB-DUs), of which DU 195 is shown. Note that the DU 195 may include or be coupled to and control a radio unit (RU). The gNB-CU 196 is a logical node hosting radio resource control (RRC), SDAP and PDCP protocols of the gNB or RRC and PDCP protocols of the en-gNB that control the operation of one or more gNB-DUs. The gNB-CU 196 terminates the F1 interface connected with the gNB-DU 195. The F1 interface is illustrated as reference 198, although reference 198 also illustrates a link between remote elements of the RAN node 170 and centralized elements of the RAN node 170, such as between the gNB-CU 196 and the gNB-DU 195. The gNB-DU 195 is a logical node hosting RLC, MAC and PHY layers of the gNB or en-gNB, and its operation is partly controlled by gNB-CU 196. One gNB-CU 196 supports one or multiple cells. One cell may be supported with one gNB-DU 195, or one cell may be supported/shared with multiple DUs under RAN sharing. The gNB-DU 195 terminates the F1 interface 198 connected with the gNB-CU 196. Note that the DU 195 is considered to include the transceiver 160, e.g., as part of a RU, but some examples of this may have the transceiver 160 as part of a separate RU, e.g., under control of and connected to the DU 195. The RAN node 170 may also be an eNB (evolved NodeB) base station, for LTE (long term evolution), or any other suitable base station or node.

The RAN node 170 includes one or more processors 152, one or more memories 155, one or more network interfaces (N/W I/F(s)) 161, and one or more transceivers 160 interconnected through one or more buses 157. Each of the one or more transceivers 160 includes a receiver, Rx, 162 and a transmitter, Tx, 163. The one or more transceivers 160 are connected to one or more antennas 158. The one or more memories 155 include computer program code 153. The CU 196 may include the processor(s) 152, memory(ies) 155, and network interfaces 161. Note that the DU 195 may also contain its own memory/memories and processor(s), and/or other hardware, but these are not shown.

The RAN node 170 includes a module 150, may include one of or both parts 150-1 and/or 150-2, which may be implemented in a number of ways. The module 150 may be implemented in hardware as module 150-1, such as being implemented as part of the one or more processors 152. The module 150-1 may be implemented also as an integrated circuit or through other hardware such as a programmable gate array. In another example, the module 150 may be implemented as module 150-2, which is implemented as computer program code 153 and is executed by the one or more processors 152. For instance, the one or more memories 155 and the computer program code 153 are configured to, with the one or more processors 152, cause the RAN node 170 to perform one or more of the operations as described herein. Note that the functionality of the module 150 may be distributed, such as being distributed between the DU 195 and the CU 196, or be implemented solely in the DU 195.

The one or more network interfaces 161 communicate over a network such as via the links 176 and 131. Two or more gNBs 170 may communicate using, e.g., link 176. The link 176 may be wired or wireless or both and may implement, for example, an Xn interface for 5G, an X2 interface for LTE, or other suitable interface for other standards.

The one or more buses 157 may be address, data, or control buses, and may include any interconnection mechanism, such as a series of lines on a motherboard or integrated circuit, fiber optics or other optical communication equipment, wireless channels, and the like. For example, the one or more transceivers 160 may be implemented as a remote radio head (RRH) 195 for LTE or a distributed unit (DU) 195 for gNB implementation for 5G, with the other elements of the RAN node 170 possibly being physically in a different location from the RRH/DU 195, and the one or more buses 157 could be implemented in part as, for example, fiber optic cable or other suitable network connection to connect the other elements (e.g., a central unit (CU), gNB-CU 196) of the RAN node 170 to the RRH/DU 195. Reference 198 also indicates those suitable network link(s).

A RAN node/gNB can comprise one or more TRPs to which the methods described herein may be applied. FIG. 1 shows that the RAN node 170 comprises two TRPs, TRP 51 and TRP 52. The RAN node 170 may host or comprise other TRPs not shown in FIG. 1.

A relay node in NR is called an integrated access and backhaul node. A mobile termination part of the IAB node facilitates the backhaul (parent link) connection. In other words, it is the functionality which carries UE functionalities. The distributed unit part of the IAB node facilitates the so called access link (child link) connections (i.e. for access link UEs, and backhaul for other IAB nodes, in the case of multi-hop IAB). In other words, it is responsible for certain base station functionalities. The IAB scenario may follow the so called split architecture, where the central unit hosts the higher layer protocols to the UE and terminates the control plane and user plane interfaces to the 5G core network.

It is noted that the description herein indicates that "cells" perform functions, but it should be clear that equipment which forms the cell may perform the functions. The cell makes up part of a base station. That is, there can be multiple cells per base station. For example, there could be three cells for a single carrier frequency and associated bandwidth, each cell covering one-third of a 360 degree area so that the single base station's coverage area covers an approximate oval or circle. Furthermore, each cell can correspond to a single carrier and a base station may use multiple carriers. So if there are three 120 degree cells per carrier and two carriers, then the base station has a total of 6 cells.

The wireless network 100 may include a network element or elements 190 that may include core network functionality, and which provides connectivity via a link or links 181 with a further network, such as a telephone network and/or a data communications network (e.g., the Internet). Such core network functionality for 5G may include location management functions (LMF(s)) and/or access and mobility management function(s) (AMF(S)) and/or user plane functions (UPF(s)) and/or session management function(s) (SMF(s)). Such core network functionality for LTE may include MME (Mobility Management Entity)/SGW (Serving Gateway) functionality. Such core network functionality may include SON (self-organizing/optimizing network) functionality. These are merely example functions that may be supported by the network element(s) 190, and note that both 5G and LTE functions might be supported. The RAN node 170 is coupled via a link 131 to the network element 190. The link 131 may be implemented as, e.g., an NG interface for 5G, or an S1 interface for LTE, or other suitable interface for other standards. The network element 190 includes one or more processors 175, one or more memories 171, and one or more network interfaces (N/W I/F(s)) 180, interconnected through one or more buses 185. The one or more memories 171 include computer program code 173. Computer program code 173 may include SON and/or MRO functionality 172.

The wireless network 100 may implement network virtualization, which is the process of combining hardware and software network resources and network functionality into a single, software-based administrative entity, a virtual network. Network virtualization involves platform virtualization, often combined with resource virtualization. Network virtualization is categorized as either external, combining many networks, or parts of networks, into a virtual unit, or internal, providing network-like functionality to software containers on a single system. Note that the virtualized entities that result from the network virtualization are still implemented, at some level, using hardware such as processors 152 or 175 and memories 155 and 171, and also such virtualized entities create technical effects.

The computer readable memories 125, 155, and 171 may be of any type suitable to the local technical environment and may be implemented using any suitable data storage technology, such as semiconductor based memory devices, flash memory, magnetic memory devices and systems, optical memory devices and systems, non-transitory memory, transitory memory, fixed memory and removable memory. The computer readable memories 125, 155, and 171 may be means for performing storage functions. The processors 120, 152, and 175 may be of any type suitable to the local technical environment, and may include one or more of general purpose computers, special purpose computers, microprocessors, digital signal processors (DSPs) and processors based on a multi-core processor architecture, as non-limiting examples. The processors 120, 152, and 175 may be means for performing functions, such as controlling the UE 110, RAN node 170, network element(s) 190, and other functions as described herein.

In general, the various example embodiments of the user equipment 110 can include, but are not limited to, cellular telephones such as smart phones, tablets, personal digital assistants (PDAs) having wireless communication capabilities, portable computers having wireless communication capabilities, image capture devices such as digital cameras having wireless communication capabilities, gaming devices having wireless communication capabilities, music storage and playback appliances having wireless communication capabilities, Internet appliances permitting wireless Internet access and browsing, tablets with wireless communication capabilities, head mounted displays such as those that implement virtual/augmented/mixed reality, as well as portable units or terminals that incorporate combinations of such functions. The UE 110 can also be a vehicle such as a car, or a UE mounted in a vehicle, a UAV such as e.g. a drone, or a UE mounted in a UAV.

UE 110, RAN node 170, and/or network element(s) 190, (and associated memories, computer program code and modules) may be configured to implement (e.g. in part) the methods described herein, including a method for identifying sidelink positioning synchronization sources. Thus, computer program code 123, module 140-1, module 140-2, and other elements/features shown in FIG. 1 of UE 110 may implement user equipment related aspects of the examples described herein. Similarly, computer program code 153, module 150-1, module 150-2, and other elements/features shown in FIG. 1 of RAN node 170 may implement gNB/TRP related aspects of the examples described herein.

Computer program code 173 and other elements/features shown in FIG. 1 of network element(s) 190 may be configured to implement network element related aspects of the examples described herein.

Having thus introduced a suitable but non-limiting technical context for the practice of the example embodiments, the example embodiments are now described with greater specificity.

A Rel-18 study item RP-213588, "Revised SID: Study on expanded and improved NR positioning" on further positioning enhancements has just started. As part of the study item sidelink positioning support is being investigated. The relevant objective is studying solutions for sidelink positioning considering the following. Scenarios to cover include coverage scenarios such as in-coverage, partial-coverage and out-of-coverage. The requirements are based on requirements identified in TR38.845, TS22.261 and TS22.104. Use cases include V2X (TR38.845), public safety (TR38.845), commercial (TS22.261), and IIOT (TS22.104). The spectrum includes ITS and licensed spectrum. The study includes identifying specific target performance requirements to be considered for the evaluation based on existing 3GPP work and inputs from industry forums, and defining an evaluation methodology with which to evaluate SL positioning for the uses cases and coverage scenarios, reusing existing methodologies from sidelink communication and from positioning as much as possible.

Other objectives include studying and evaluating performance and feasibility of potential solutions for SL positioning, considering relative positioning, ranging and absolute positioning. This includes evaluating bandwidth requirements needed to meet the identified accuracy requirements, study of positioning methods (e.g. TDOA, RTT, AOA/D, etc.) including combination of SL positioning measurements with other RAT dependent positioning measurements (e.g. Uu based measurements), study of sidelink reference signals for positioning purposes from the physical layer perspective, including signal design, resource allocation, measurements, associated procedures, etc., reusing existing reference signals, procedures, etc. from sidelink communication and from positioning as much as possible, and study of positioning architecture and signaling procedures (e.g. configuration, measurement reporting, etc.) to enable sidelink positioning covering both UE based and network based positioning.

Downlink time difference of arrival (DL-TDOA) and uplink time difference of arrival (UL-TDOA) have been introduced in NR Rel-16 and further enhanced in NR Rel-17. Both techniques rely on measuring the received time difference from/at multiple locations in order to perform trilateration and estimate the UE location. One well known drawback of TDOA techniques is the need for tight synchronization between the TRPs in order to have high positioning accuracy. However, round trip time (RTT) techniques are resource expensive and more complex as it requires both transmitting and receiving a reference signal.

In 5G NR sidelink (SL) there are multiple synchronization sources such as gNB, GNSS, or another UE. The SL synchronization signal (SLSS) ID is used to inform other UEs about some information of the synchronization source of a given UE. For example, out of coverage and in coverage UEs which are synchronized to different sources use different SLSS IDs.

In 3GPP the SL positioning study may include, with regards to the positioning methods supported using SL measurements, studying further methods including RTT-type solutions using SL, SL-AoA, SL-TDOA, and SL-AoD. For RTT-type solutions using SL, study both single-sided (also known as one-way) and double-sided (also known as two-way) RTT. For SL-AoA, include both azimuth of arrival (AoA) and zenith of arrival (ZoA) in the study. SL-AoD corresponds to a method where RSRP and/or RSRPP measurements are used similar to the DL-AoD method in Uu, and for SL-AoD, include both azimuth of departure (AoD) and zenith of departure (ZoD).

SL-TDOA may be a SL technique where multiple supporting (or anchor) UEs transmit sidelink positioning reference signals (SL PRS) to a target UE which measures the time difference between the arrival of those SL PRS signals. The measurement the target UE makes may be called sidelink reference signal time difference (SL RSTD) or SL TDOA. The SL RSTD may be defined as the time between the arrival of two different SL PRS signals from different supporting UEs.

The synchronization offset between devices causes positioning performance degradation for TDOA techniques. Similar for SL-TDOA the synchronization between UEs should be considered. If the synchronization offsets are known the positioning calculation entity can correct for them before performing the positioning estimation. One way to know the offset between nodes is to use over the air (OTA) measurements between devices with known locations.

Figure 2:
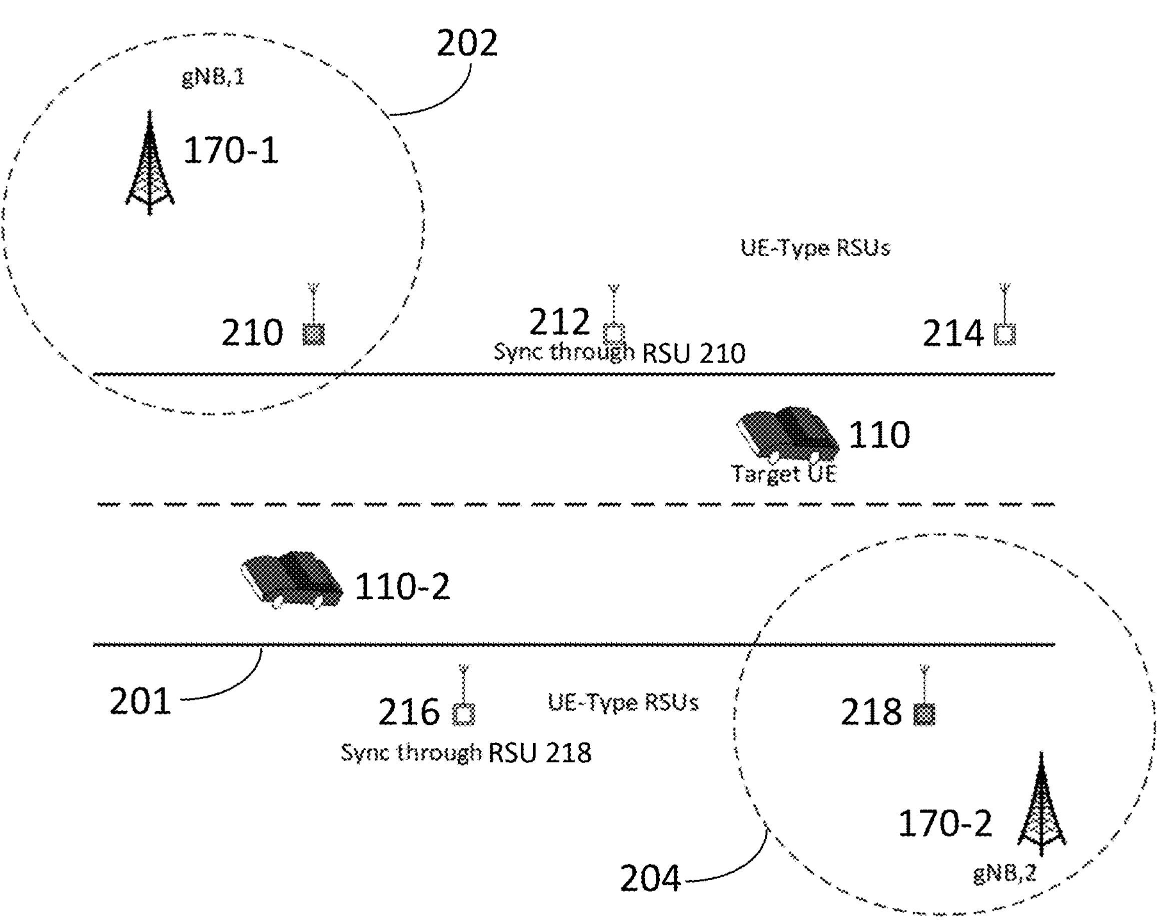
FIG. 2 shows an example scenario for SL positioning synchronization.

Referring to FIG. 2, in some cases, such as out of coverage or partial coverage, the target UE 110 (UE to be positioned) does not know the exact synchronization source of another SL UE. FIG. 2 shows an example of this case. In this example UE-Type RSUs (210, 212, 214, 216, 218) are stationed along a highway 201 (although the RSUs may have mobile capability) but not all of the RSUs are under gNB coverage. As shown, RSU 210 is under coverage of gNB 170-1 within cell 202, and RSU 218 is under coverage of gNB 170-2 within cell 204. While RSUs 212, 214 and 216 are not under coverage of either gNB 170-1 hosting cell 202 or gNB 170-2 hosting cell 204.

In this case some of the RSUs synch through other UEs to the gNB. For example, RSU 212 synchs to gNB 170-1 through RSU 210, and RSU 216 synchs to gNB 170-2 through RSU 218. However, if the target UE 110 wants to correct for the synchronization offset between the RSUs (212, 214) shown on the top of the highway (synch to gNB,1 170-1 through other RSUs/UEs) and the RSUs (e.g. 216) shown on the bottom of the highway (synch to gNB,2 170-2 through other RSUs/UEs) then the target UE 110 needs to know more detailed synchronization information. For ease of description, the example shown in FIG. 2 is based on an RSU UE-type, but the examples described herein are applicable to and valid for general SL UEs. The examples described herein solve this problem and related problems. Shown also in FIG. 2 is UE 110-2.

In 3GPP, the S-UEs in may also be described as anchor UEs or assistant UEs. For example, the supporting user equipment may comprise an anchor user equipment or a road side unit (RSU).

Concrete Example 1. Concrete example 1 illustrates the benefits and technical effects of the examples described herein. Concrete example 1 is an example of the UE 110 applying synchronization offsets during location estimation. Assume target UE (T_UE) 110 measures the SL RSTD between two supporting UEs, S_UE_1 and S_UE_2. S_UE_1 is synchronized to source gNB_1 and S_UE_2 is synchronized to source gNB_2. The synchronization offset between gNB_1 and gNB_2 is d_12. The T_UE measures the SL PRS transmission from S_UE_1 and S_UE_2 to measure the SL RSTD_12=t1−t2 (where t1 and t2 are the time of arrival of the SL PRS from S_UE_1 and S_UE_2, respectively. After measuring the SL RSTD_12 the T_UE then subtracts the synchronization offset d_12 to finalize the corrected SL RSTD 12'=SL RSTD 12–d_12.

In the state of the art the target UE does not determine which synchronization offset it should apply for a given S-UE SL PRS. It also has no provision to receive this information from either the S-UE or the LMF.

Rel-17 V2X supports the UEs to provide just rough information about their synchronization source through the SLSS ID. However, there is no way to identify which gNB a given SL UE is synchronized to in the current spec.

In Rel-16 for UE-based positioning the LMF can provide RTD (relative time difference) information as part of the PRS assistance data. The RTD helps assist the UE to account for synchronization offsets between gNBs. The UE does not have the ability to request this for particular TRPs.

Described herein is a method for a UE 110 to determine the synchronization source of supporting UEs and mitigate the impact of synchronization offsets between supporting UEs used for SL positioning.

The target UE (T-UE) 110 and supporting UE (S-UE) (e.g. one of 210, 212, 214, 216, 218) are involved in a SL-TDOA positioning session. The T-UE receives a SL-PRS from the S-UEs as an example.

The S-UE indicates the detailed synchronization source it is synchronized to, potentially via another S-UE. The detailed synchronization source (e.g., gNB/eNB ID) may include an identity of a specific synchronization source (rather than just a type of the source). Options for how this indication can be done include option 1 and option 2.

Option 1 is to add a new synchronization source information element in the SL-PRS configuration. E.g., a sync ID. In this option the S-UE may also report the mapping between sync ID and gNB/eNB ID to the LMF/T-UE.

Option 2 is to use the SL PRS ID to convey the synchronization source information. Some sets of SL PRS ID may be mapped to cell IDs (e.g., PCI) for gNBs. Some SL PRS ID may be a function of the cell ID (e.g., PCI) and the S-UE ID. The mappings/functions may either be hard coded (e.g., pre-agreed upon) or signaled/forwarded to the T-UE (e.g., by LMF). As one embodiment, a UE may use different synchronization sources for different PRS resource sets (e.g., to align better with other S-UEs).

As used within this disclosure, the SL PRS ID may be configured as part of a sidelink positioning reference signal (SL PRS) configuration. The SL PRS ID may identify the sidelink synchronization source via a mapping of the SL PRS ID to a physical cell identifier (PCI).

The T-UE can request S-UEs to provide the synchronization source (e.g., sync ID or PCI) for SL PRS resource(s), if the S-UE did not provide it and the SL PRS resource(s) are to be used for RSTD measurement and/or reporting.

In UE-assisted positioning (where the LMF or another entity is calculating the final UE location estimate), the T-UE reports the synchronization source of the S-UEs to the LMF as part of the measurement report. For example, the T-UE indicates that a set of S-UEs are associated with the same sync source (e.g., gNB A, Sync ID X). For example, when the T-UE reports a RSTD measurement which was measured from two different SL PRS resources, it also reports two synchronization sources for this RSTD measurement. The LMF may compensate for synchronization error in the measurement using synchronization offset information (e.g., RTD) between two gNBs.

In UE-based positioning (where the target UE is the entity calculating the final UE location estimate), the T-UE requests the synchronization offset between S-UEs either from LMF or directly from S-UEs. For many S-UEs (e.g., UE-type RSUs) that the synchronization offset can be measured OTA. This should be reasonable for UE-type RSUs as they are static and fixed at a certain location. It may also be possible to measure the synchronization offset OTA for other types of SL UEs (e.g., temporarily static UEs). The S-UEs may directly get the T-UE request in the case that the LMF is not involved in the positioning (e.g., the fully out of coverage case).

In UE-based positioning, the LMF requests the synchronization source and offset information from S-UEs/gNBs if not available already. The LMF (or S-UEs directly) signals the synchronization offset of the S-UE sources to the UE. This synchronization offset information enables the T-UE to do a mapping between S-UE SL PRS signals and synchronization offsets. In a first option, the LMF signals directly the offset between the S-UEs. In another example related to this first option, the LMF signals the offset between different sets of SL PRS resources. In a second option, the LMF signals only the gNB synchronization offsets. For example, the T-UE may use gNB sync offsets to compensate for synchronization error of RSTD measurement for different SL-PRS resources if the T-UE obtained the synchronization source of those SL-PRS resources.

The entity calculating the UE location (LMF/other entity in UE-assisted positioning, UE in UE-based positioning) uses the synchronization offset mapping, optionally with the determined synchronization sources of the S-UEs, to correct the TDOA measurement.

Without the mapping between the S-UEs and synchronization offsets the T-UE would not be able to correct for the errors in the SL RSTD measurements caused by the synchronization offsets and therefore would have less accurate positioning measurements.

The measurements by the terminal device are corrected by the network entity using the synchronization offsets among the plurality of supporting terminal devices, and the position of the terminal device is determined by the network entity using the corrected measurements. Although a plurality of supporting terminal devices may be used (in actual practice), the herein described terminal device and the methods are also applicable even when only one supporting terminal device is used.

Figure 3:
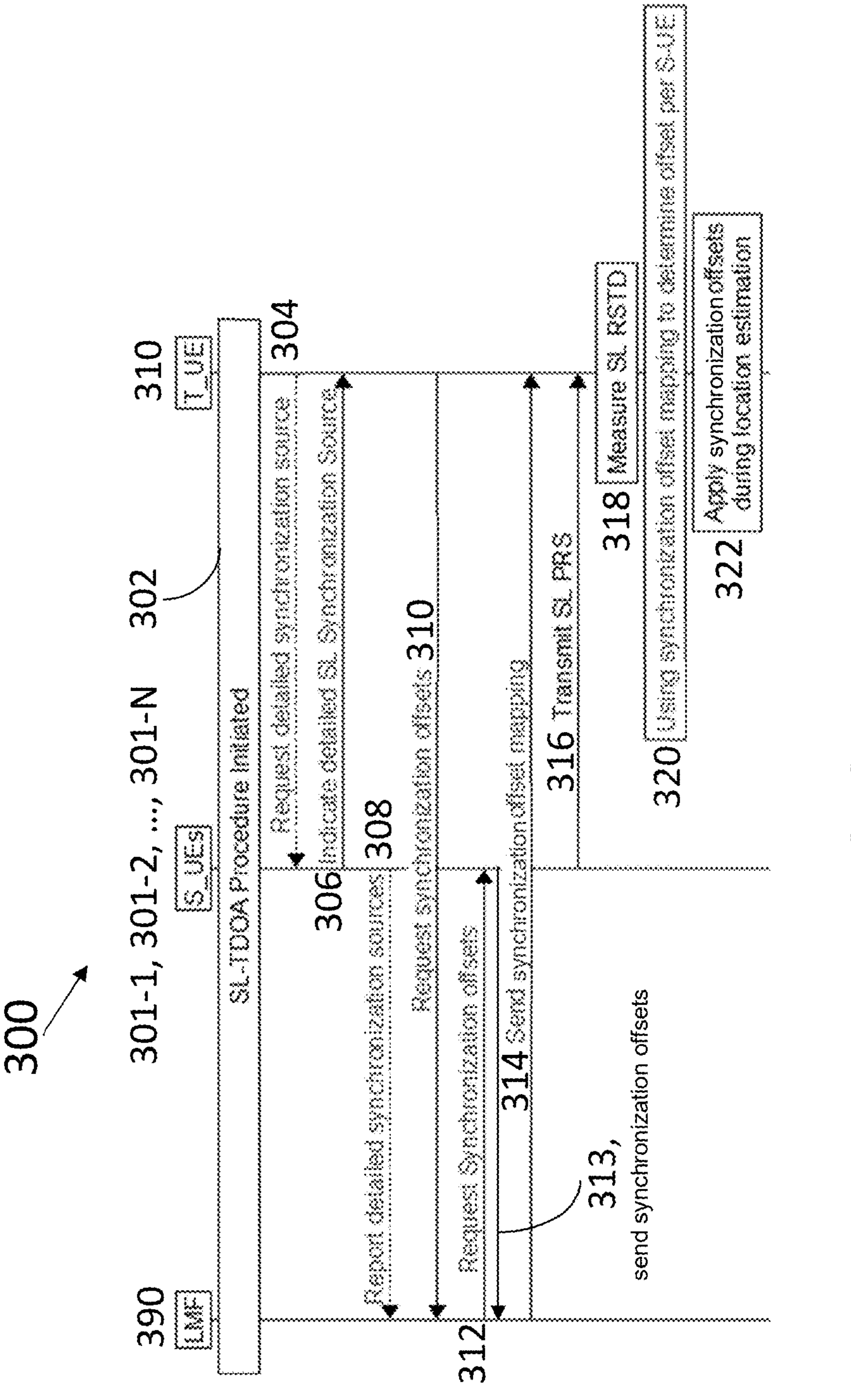
FIG. 3 shows a UE-based, LMF-assisted signaling flow.

FIG. 3 shows the signaling flow 300 for a method in the case of UE-based, LMF-assisted positioning where the T-UE calculates the location estimate but receives some assistance from the LMF. At 302, the SL-TDOA procedure is initiated with the LMF 390, the S_UEs (301-1, 301-2, . . . , 301-N), and the T_UE 310. At 304, the T_UE 310 requests a detailed synchronization source from one or more of the S_UEs (301-1, 301-2, . . . , 301-N). At 306, one or more of the S_UEs (301-1, 301-2, . . . , 301-N) indicates to the T_UE 310 the detailed SL synchronization source. At 308, one or more of the S_UEs (301-1, 301-2, . . . , 301-N) reports the detailed synchronization sources to the LMF 390. At 310, the T_UE 310 requests synchronization offsets from the LMF 390. At 312, the LMF 390 requests one or more of the synchronization offsets from the S_UEs (301-1, 301-2, . . . , 301-N).

At 313, the one or more S_UEs (301-1, 301-2, . . . , 301-N) transmits the synchronization offsets to the LMF 390. At 314, the LMF 390 sends a synchronization offset mapping to the T_UE 310. At 316, the one or more S_UEs (301-1, 301-2, . . . , 301-N) transmits a SL PRS to the T_UE 310. At 318, the T_UE 310 measures SL RTD. At 320, the T_UE 310 uses the synchronization offset mapping to determine a synchronization offset per S_UE. At 322, the T_UE 310 applies the one or more synchronization offsets during location estimation.

Figure 4:
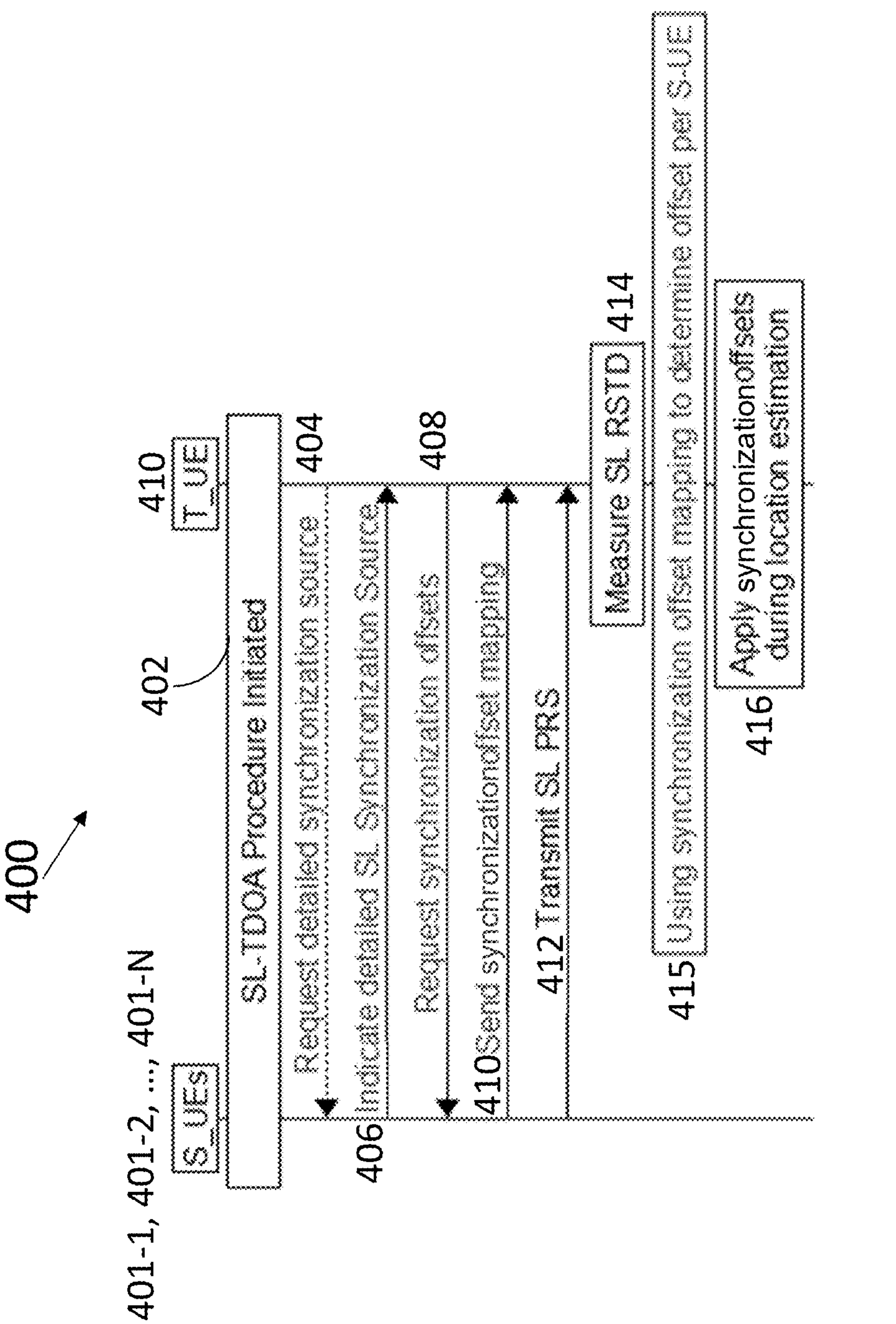
FIG. 4 shows a UE-based, non-LMF assisted signaling flow.

FIG. 4 shows the signaling flow 400 for a method in the case of UE-based, non-LMF-assisted positioning where the T-UE calculates the location estimate without assistance from the LMF. This could represent at least the case where the T-UE is out of coverage and the S-UEs are communicating directly with the T-UE.

At 402, the SL-TDOA procedure is initiated with the one or more S_UEs (401-1, 401-2, . . . , 401-N) and the T_UE 410. At 404, the T_UE 410 requests a detailed synchronization source from the one or more S_UEs (401-1, 401-2, . . . , 401-N). At 406, the one or more S_UEs (401-1, 401-2, . . . , 401-N) indicates the detailed synchronization source to the T_UE 410. At 408, the T_UE 410 requests one or more synchronization offsets from the one or more S_UEs (401-1, 401-2, . . . , 401-N).

At 410, the one or more S_UEs (401-1, 401-2, . . . , 401-N) sends a synchronization offset mapping to the T_UE 410. At 412, the one or more S_UEs (401-1, 401-2, . . . , 401-N) transmits a SL PRS to the T_UE 410. At 414, the T_UE 410 measures SL RSTD. At 414, the T_UE 410 uses the synchronization offset mapping to determine the offset per S_UE. At 416, the T_UE 410 applies the synchronization offsets during location estimation.

Figure 5:
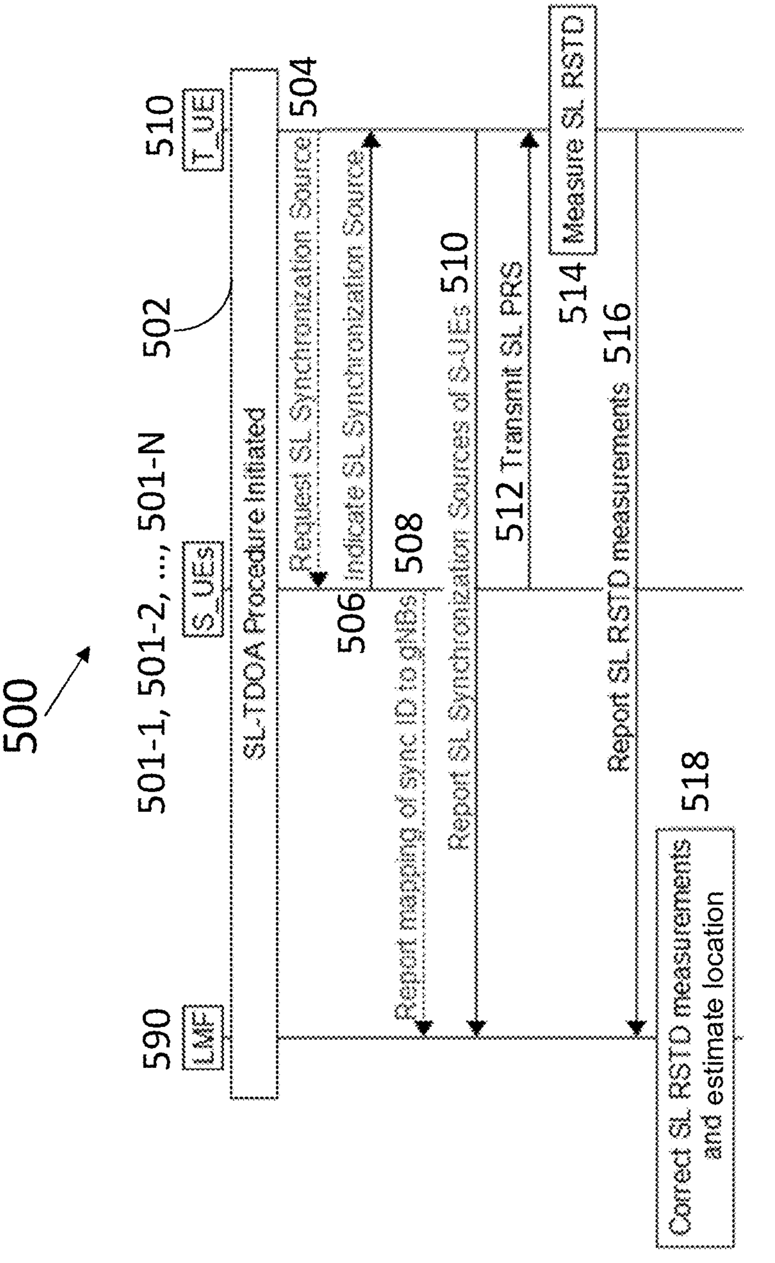
FIG. 5 shows a UE assisted signaling flow.

FIG. 5 shows the signaling flow 500 for a method in the case of UE-assisted positioning. In this case the T-UE and S-UEs communicate directly to exchange the information.

At 502, an SL-TDOA procedure is initiated with the LMF 590, the one or more S_UEs (501-1, 501-2, . . . , 501-N) and the T_UE 510. At 504, the T_UE 510 requests a SL synchronization source from the one or more S_UEs (501-1, 501-2, . . . , 501-N). At 506, the one or more S_UEs (501-1, 501-2, . . . , 501-N) indicates the SL synchronization source to the T_UE 510. At 508, the one or more S_UEs (501-1, 501-2, . . . , 501-N) reports the mapping of synchronization IDs to the LMF 590. At 512, the one or more S_UEs (501-1, 501-2, . . . , 501-N) transmits an SL PRS to the T_UE 510. At 514, the T_UE 510 measures the SL RSTD. At 516, the T_UE 510 reports the SL RSTD measurements to the LMF 590. At 518, the LMF 590 corrects the SL RSTD measurements and estimates the location of the T_UE 510.

FIG. 6A shows an example mapping 600 to synchronization offsets, the mapping 600 may include individual mappings. For example, the LMF 390 of FIG. 3 may send to the T_UE 310 the entire mapping 600, or one or more of mapping 1, mapping 2, mapping 3, mapping 4, mapping 5, and mapping 6, for the T_UE 310 to use to estimate its location at 322. In FIG. 4, one of the S_UEs such as S_UE 401-1 may send to the T_UE 410 one or more of mapping 1, mapping 2, mapping 3, mapping 4, mapping 5, and mapping 6 (e.g. the entire mapping 600) for the T_UE 410 to estimate its location at 416.

FIG. 6B shows a mapping 650 of supporting UEs to synchronization sources, which mapping 650 may be used by a target UE (310, 410, 510) or LMF (390, 590) to determine which supporting UEs are synched to which synchronization sources, and further to determine a SL RSTD. Within mapping 650 are several individual mappings, each mapping indicating which synchronization source the respective supporting UE (UE_1, UE_2, UE_3) is synched to. Mapping 650, or any one of individual mappings within mapping 650 may be signaled by a supporting UE (301-1, 301-2, 301-N, 401-1, 401-2, 401-N, 501-1, 501-2, 501-N) to a target UE (310, 410, 510) or to an LMF (390, 590).

FIG. 6C shows a mapping 675 of synchronization IDs to synchronization sources, the mapping 675 may include individual mappings. The S-UE may report any of the mappings within 675 between sync ID and gNB/eNB ID to the LMF/T-UE, or the entire mapping 675.

FIG. 6D shows a mapping 680 between S-UE SL PRS signals and synchronization offsets, the mapping 680 may include individual mappings. In an embodiment, the LMF (or one or more S-UEs directly) signals the synchronization offset of the S-UE sources to the UE. This synchronization offset information enables the T-UE to do the mapping 680 between S-UE SL PRS signals and synchronization offsets.

FIG. 6E shows a mapping 690 between SL PRS IDs to PCIs, the mapping 690 comprised of individual mappings. With one or more of the mappings within 690, the SL PRS ID may be used to convey the synchronization source information, as some sets of SL PRS IDs may be mapped to cell IDs (e.g., PCI) for gNBs.

An additional embodiment is directed to when the UEs perform synchronization behavior using a SS/PBCH block transmitted from a specific gNB. Based on the examples described herein, the S-UE can inform the T-UE which gNB(s) it used for synchronization. It should be noted that multiple TRPs (e.g. TRP 51, TRP 51) may be in a single gNB (e.g. RAN node 170). This means that TRPs may not be differentiated by physical cell ID from the UE side. In the current LPP signaling, the LMF (e.g. 190) can provide the UE (e.g. 110) with the RTD (relative time difference) not only for between cells but also for between different TRPs within the same cell. Unless the S-UE provides the TRP ID as a synchronization source, the T-UE cannot use the RTD information for compensation of measurement.

The UE can perform synchronization using both DL PRS and SSB by implementation, and hence the S-UE could report TRP information (e.g., TRP ID) as the synchronization source to the T-UE (or to the LMF) as part of the measurement report.

Concrete Example 2. For better understanding of the contribution of the examples described herein, described next is an example assuming an out of coverage scenario with a single T-UE and two different S-UEs. Based on the current system, the LMF 190 may provide the T-UE 110 with the information on synchronization offsets between cells and/or TRPs within the same cell by broadcasting positioning assistance data. The T-UE measures SL RSTD from two SL-PRSs transmitted by two S-UEs (e.g. 210, 212, 214, 216, 218). Although the T-UE may have synchronization offset information between the cells and/or TRPs, the T-UE cannot compensate for the SL RSTD because the T-UE still does not know or cannot differentiate the synchronization sources of the two S-UEs. Therefore, based on the current state of the art, the T-UE cannot correct for the synchronization offset between the two S-UE SL PRS. The herein described examples solve the above problems. For example, using the examples described herein, the T-UE may identify the synchronization source information of the S-UEs and receive the respective synchronization offset information. Using the respective synchronization offset information, the T-UE is able to improve the accuracy of the SL positioning procedure. For example, the two S-UEs (e.g. 210, 218) send to the T-UE 110 synchronization information such as (PCI1, TRP #1) and (PCI #2, TRP #2), respectively, and the T-UE 110 can then utilize the respective synchronization offset information on (PCI1, TRP #1) and (PCI #2, TRP #2) which are respectively provided by the LMF 190, to compensate for the SL RSTD measurement to thus improve the accuracy of the SL positioning procedure. This procedure is not contemplated in the current state of the art.

SL-RSTD measurement may include the case of DL-PRS transmitted from a TRP and SL-PRS transmitted from a supporting UE.

Advantages and technical effects of the examples described herein include improved positioning accuracy, mitigation of the impact of synchronization errors on positioning, and enabling SL-TDOA (over SL-RTT) resulting in a reduction of resource overhead.

Figure 7:
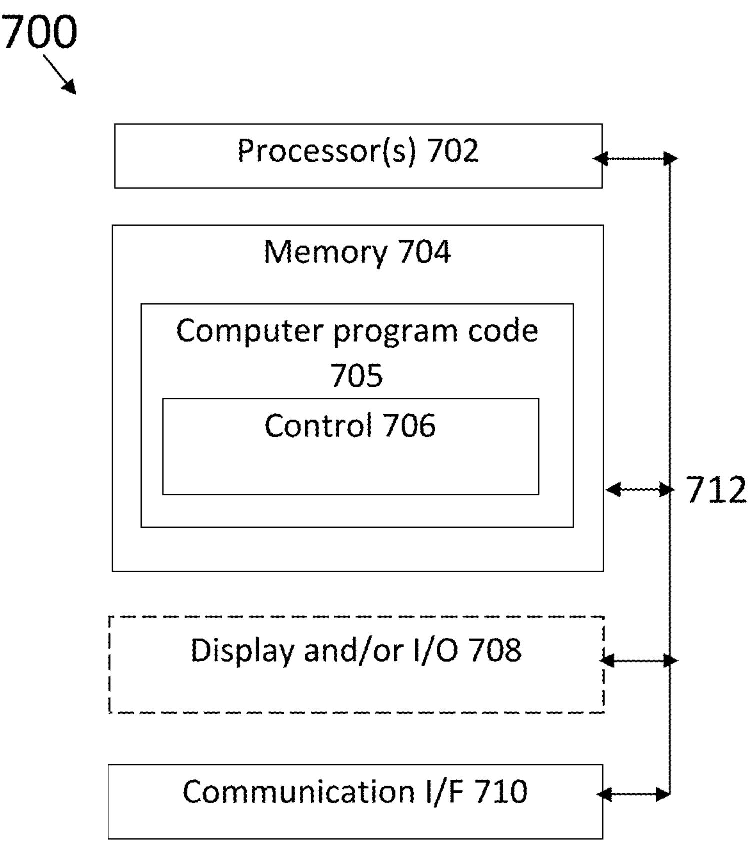
FIG. 7 is an example apparatus configured to implement the examples described herein.

FIG. 7 is an example apparatus 700, which may be implemented in hardware, configured to implement the examples described herein. The apparatus 700 comprises at least one processor 702 (e.g. an FPGA and/or CPU), at least one memory 704 including computer program code 705, wherein the at least one memory 704 and the computer program code 705 are configured to, with the at least one processor 702, cause the apparatus 700 to implement circuitry, a process, component, module, or function (collectively control 706) to implement the examples described herein, including a method for identifying sidelink positioning synchronization sources. The memory 704 may be a non-transitory memory, a transitory memory, a volatile memory (e.g. RAM), or a non-volatile memory (e.g. ROM).

The apparatus 700 optionally includes a display and/or I/O interface 708 that may be used to display aspects or a status of the methods described herein (e.g., as one of the methods is being performed or at a subsequent time), or to receive input from a user such as with using a keypad, camera, touchscreen, touch area, microphone, biometric recognition, one or more sensors, etc. The apparatus 700 includes one or more communication e.g. network (N/W) interfaces (I/F(s)) 710. The communication I/F(s) 710 may be wired and/or wireless and communicate over the Internet/other network(s) via any communication technique. The communication I/F(s) 710 may comprise one or more transmitters and one or more receivers. The communication I/F(s) 710 may comprise standard well-known components such as an amplifier, filter, frequency-converter, (de) modulator, and encoder/decoder circuitries and one or more antennas.

The apparatus 700 to implement the functionality of control 706 may be UE 110, RAN node 170 (e.g. gNB), network element(s) 190, or any of the apparatuses shown in FIGS. 2-5, including any of the T_UEs, S_UEs, or LMFs. Thus, processor 702 may correspond to processor(s) 120, processor(s) 152 and/or processor(s) 175, memory 704 may correspond to memory(ies) 125, memory(ies) 155 and/or memory(ies) 171, computer program code 705 may correspond to computer program code 123, module 140-1, module 140-2, and/or computer program code 153, module 150-1, module 150-2, and/or computer program code 173, and communication I/F(s) 710 may correspond to transceiver 130, antenna(s) 128, transceiver 160, antenna(s) 158, N/W I/F(s) 161, and/or N/W I/F(s) 180. Alternatively, apparatus 700 may not correspond to either of UE 110, RAN node 170, network element(s) 190, or any of the apparatuses shown in FIGS. 2-5 (T_UEs, S_UEs, or LMFs) as apparatus 700 may be part of a self-organizing/optimizing network (SON) node, such as in a cloud.

The apparatus 700 may also be distributed throughout the network (e.g. 100) including within and between apparatus 700 and any network element (such as a network control element (NCE) 190 and/or the RAN node 170 and/or the UE 110).

Interface 712 enables data communication between the various items of apparatus 700, as shown in FIG. 7. For example, the interface 712 may be one or more buses such as address, data, or control buses, and may include any interconnection mechanism, such as a series of lines on a motherboard or integrated circuit, fiber optics or other optical communication equipment, and the like. Computer program code 705, including control 706 may comprise object-oriented software configured to pass data/messages between objects within computer program code 705. The apparatus 700 need not comprise each of the features mentioned, or may comprise other features as well.

Figure 8:
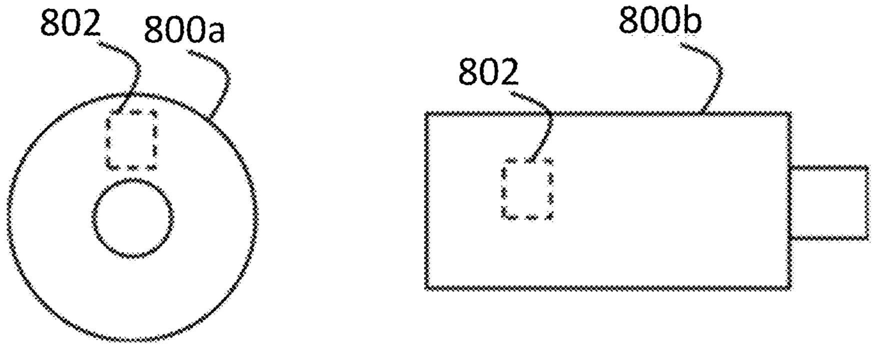
FIG. 8 shows a representation of an example of non-volatile memory media.

FIG. 8 shows a schematic representation of non-volatile memory media 800*a* (e.g. computer disc (CD) or digital versatile disc (DVD)) and 800*b* (e.g. universal serial bus (USB) memory stick) storing instructions and/or parameters 802 which when executed by a processor allows the processor to perform one or more of the steps of the methods described herein.

Figure 9:
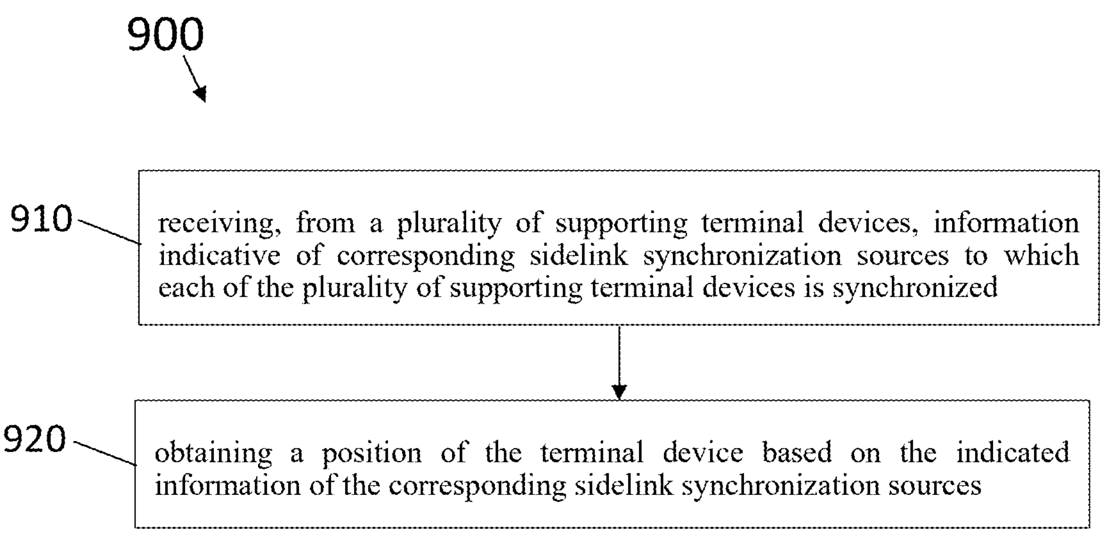
FIG. 9 is an example method performed with a target terminal device to implement the examples described herein.

FIG. 9 is an example method 900 to implement the example embodiments described herein. At 910, the method includes receiving, from a plurality of supporting terminal devices, information indicative of corresponding sidelink synchronization sources to which each of the plurality of supporting terminal devices is synchronized. At 920, the method includes obtaining a position of the terminal device, which is based on the indicated information of the corresponding sidelink synchronization sources. Method 900 may be performed with a target terminal device.

Figure 10:
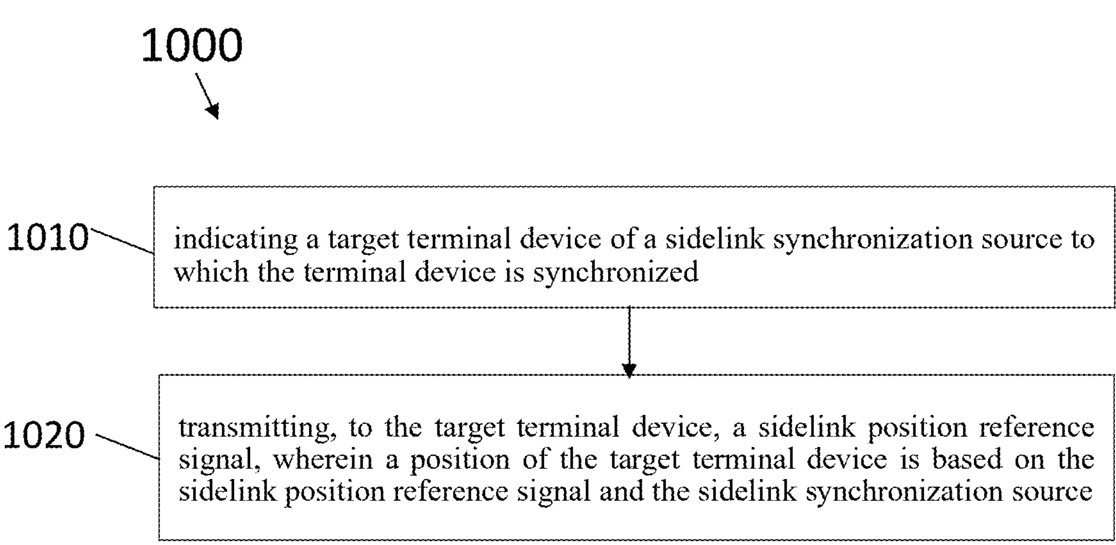
FIG. 10 is an example method performed with a supporting terminal device to implement the examples described herein.

FIG. 10 is an example method 1000 to implement the example embodiments described herein. At 1010, the method includes indicating a target terminal device of a sidelink synchronization source to which the terminal device is synchronized. At 1020, the method includes transmitting, to the target terminal device, a sidelink position reference signal, wherein a position of the target terminal device is based on the sidelink position reference signal and the sidelink synchronization source. Method 1000 may be performed with a supporting terminal device.

Figure 11:
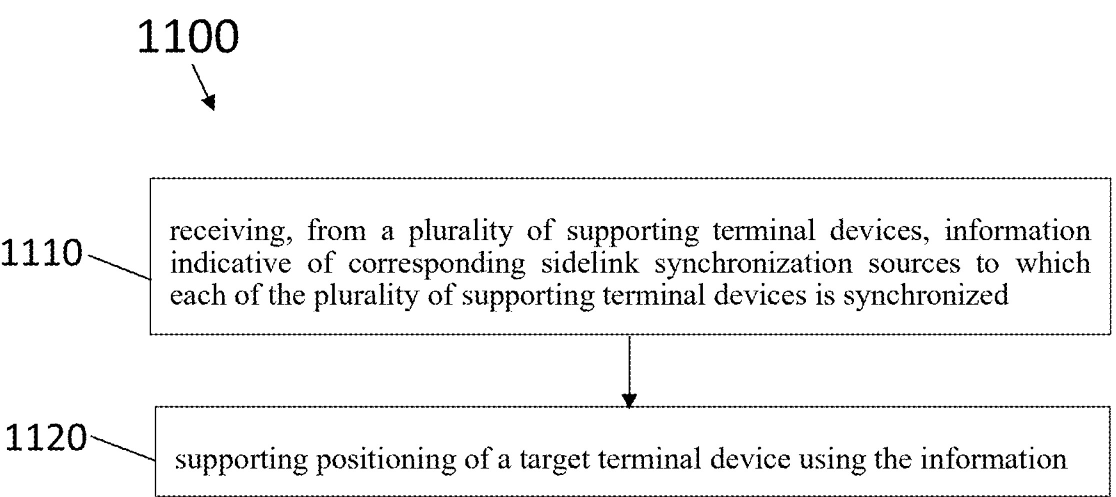
FIG. 11 is an example method performed with a network entity to implement the examples described herein.

FIG. 11 is an example method 1100 to implement the example embodiments described herein. At 1110, the method includes receiving, from a plurality of supporting terminal devices, information indicative of corresponding sidelink synchronization sources to which each of the plurality of supporting terminal devices is synchronized. At 1120, the method includes supporting positioning of a target terminal device using the information. Method 1100 may be performed with a location management entity.

The following examples (1-63) are provided and described herein for illustrations only and should not be limiting.

Example 1. A terminal device (T_UE) including: at least one processor; and at least one memory including computer program code; wherein the at least one memory and the computer program code are configured to, with the at least one processor, cause the terminal device at least to: receive (steps 306, 406, 506), from a plurality of supporting terminal devices (S_UEs), information indicative of corresponding sidelink synchronization sources (e.g., gNBs) to which each of the plurality of supporting terminal devices is synchronized; and obtain a position of the terminal device (steps 322, 416, 518), which is based on the indicated information of the corresponding sidelink synchronization sources.

Example 2. The terminal device of example 1, wherein the position of the terminal device is determined based on synchronization offsets (steps 320, 415) among the plurality of supporting terminal devices.

Example 3. The terminal device of example 1 or 2, wherein the receiving of the information is responsive to a request (steps 304, 404, 504) by the terminal device, for the corresponding sidelink synchronization sources to which each of the plurality of supporting terminal devices is synchronized.

Example 4. The terminal device of any preceding examples 1-3, wherein the terminal device is caused to: perform respective measurements on one or more sidelink position reference signals (steps 316, 412, 512) from the plurality of supporting terminal devices.

Example 5. The terminal device of example 4, wherein the measurements (steps 318, 414, 514) are sidelink reference signal time difference (SL RSTD) measurements.

Example 6. The terminal device of any preceding examples 2-5, wherein the terminal device (T_UE) is caused to: receive, from a network entity (LMF), the synchronization offsets (steps 314, 410) among the plurality of supporting terminal devices (S_UEs); and determine the position (steps 322, 416) of the terminal device based on the measurements (318, 414) and the synchronization offsets (steps 314, 410) among the plurality of supporting terminal devices.

Example 7. The terminal device of example 6, wherein the terminal device is caused to: correct the measurements (steps 322, 416) using the synchronization offsets (steps 314, 410) among the plurality of supporting terminal devices; and determine the position (steps 322, 416) of the terminal device using the corrected measurements (steps 320, 415).

Example 8. The terminal device of example 4, wherein the terminal device is caused to: transmit, to a network entity (LMF), a measurement report (step 516) including the measurements by the terminal device.

Example 9. The terminal device of example 8, wherein the measurement report indicates the corresponding sidelink synchronization sources (indirectly through step 510) to which each of the plurality of supporting terminal devices is synchronized.

Example 10. The terminal device of example 8, wherein the terminal device is caused to: transmit (step 510), to the network entity, an indication indicative of the corresponding sidelink synchronization sources to which each of the plurality of supporting terminal devices is synchronized.

Example 11. The terminal device of example 9 or 10, wherein the measurements by the terminal device are corrected by the network entity (step 518) using the synchronization offsets among the plurality of supporting terminal devices, and the position of the terminal device is determined by the network entity using the corrected measurements.

Example 12. A terminal device (S_UE) including: at least one processor; and at least one memory including computer program code; wherein the at least one memory and the computer program code are configured to, with the at least one processor, cause a terminal device at least to: indicate (steps 306, 406, 506), to a target terminal device (T_UE), of a sidelink synchronization source (gNB) to which the terminal device is synchronized, wherein the terminal device (S_UE) and the target terminal device (T_UE) are different devices in a radio network; and transmit, to the target terminal device, a sidelink position reference signal (steps 316, 412) to enable a determination of a position of the target terminal device (step 414), which is based on the sidelink position reference signal and the sidelink synchronization source.

Example 13. The terminal device of example 12, wherein the terminal device is caused to: receive, from the target terminal device, a request (steps 304, 404) for the sidelink synchronization source to which the terminal device is synchronized.

Example 14. The terminal device of example 12, wherein the terminal device is caused to: transmit, to a location management entity (LMF), a mapping between the sidelink synchronization source and a network device serving the terminal device (step 508).

Example 15. The terminal device of example 12, wherein the terminal device is caused to: provide (step 313), to a location management entity (LMF), a synchronization offset between the terminal device and another terminal device, wherein the synchronization offset is used to determine the position of the target terminal device.

Example 16. The terminal device of example 12, wherein the terminal device is caused to: transmit (step 508), to a location management entity (LMF), a mapping between an identifier of the sidelink synchronization source and a network device serving the terminal device.

Example 17. The terminal device of example 16, wherein the mapping is used to determine (step 518) by the location management entity the position of the target terminal device.

Example 18. A location management entity (LMF) including: at least one processor; and at least one memory including computer program code; wherein the at least one memory and the computer program code are configured to, with the at least one processor, cause the location management entity at least to: receive (step 510), from a plurality of supporting terminal devices (S_UE), information indicative of corresponding sidelink synchronization sources (e.g., gNB) to which each of the plurality of supporting terminal devices is synchronized; and support positioning determination (step 518) of a target terminal device (T_UE) using the indicated information.

Example 19. The location management entity of example 18, wherein the location management entity is caused to: acquire synchronization offsets (step 313), among the plurality of supporting terminal devices.

Example 20. The location management entity of example 19, wherein the location management entity is caused to: determine, a position of the target terminal device (T_UE) based on the synchronization offsets among the plurality of supporting terminal devices (step 518).

Example 21. The location management entity of example 19, wherein the location management entity is caused to: provide, to the target terminal device (T_UE), the synchronization offsets among the plurality of supporting terminal devices (step 314), wherein the synchronization offsets among the plurality of supporting terminal devices are used to determine a position of the target terminal device.

Example 22. A method of determining a position of a terminal device (T_UE), the method including performing by a terminal device, steps may include: receiving, (steps 306, 406, 506) from a plurality of supporting terminal devices (S_UEs), information indicative of corresponding sidelink synchronization sources (e.g., gNBs) to which each of the plurality of supporting terminal devices is synchronized; and obtaining (steps 322, 416, 518), a position of the terminal device, which is based on the indicated information of the corresponding sidelink synchronization sources.

Example 23. The method of example 22, wherein the position of the terminal device is determined based on synchronization offsets among the plurality of supporting terminal devices.

Example 24. The method of example 22 or 23, wherein the receiving of the information is responsive to a request by the terminal device, for the corresponding sidelink synchronization sources to which each of the plurality of supporting terminal devices is synchronized.

Example 25. The method of any preceding examples 22-24, further including: performing respective measurements by the terminal device, on one or more sidelink position reference signals from the plurality of supporting terminal devices.

Example 26. The method of example 25, wherein the measurements are sidelink reference signal time difference (SL RSTD) measurements.

Example 27. The method of any preceding examples 23-26, further including: receiving by the terminal device, from a network entity, the synchronization offsets among the plurality of supporting terminal devices; and determining the position of the terminal device based on the measurements and the synchronization offsets among the plurality of supporting terminal devices.

Example 28. The method of example 27, further including: correcting by the terminal device, the measurements using the synchronization offsets among the plurality of supporting terminal devices; and determining the position of the terminal device using the corrected measurements.

Example 29. The method of example 25, further including: transmitting by the terminal device, to a network entity, a measurement report including the measurements by the terminal device.

Example 30. The method of example 29, wherein the measurement report indicates the corresponding sidelink synchronization sources to which each of the plurality of supporting terminal devices is synchronized.

Example 31. The method of example 29, further including: transmitting by the terminal device, to the network entity, an indication indicative of the corresponding sidelink synchronization sources to which each of the plurality of supporting terminal devices is synchronized.

Example 32. The method of example 30 or 31, wherein the measurements by the terminal device are corrected by the network entity using the synchronization offsets among the plurality of supporting terminal devices, and the position of the terminal device is determined by the network entity using the corrected measurements.

Example 33. A method of determining a position of a target terminal device, the method including performing by a terminal device (S_UE), steps may include: indicating (steps 306, 406, 506), to a target terminal device (T_UE) of a sidelink synchronization source (gNB) to which the terminal device is synchronized; and transmitting (steps 316, 412), to the target terminal device, a sidelink position reference signal (steps 316, 412) to enable a determination of a position of the target terminal device (step 414), which is based on the sidelink position reference signal and the sidelink synchronization source. In another aspect, the terminal device and the target terminal device may be different devices in a radio network.

Example 34. The method of example 33, further including: receiving, from the target terminal device, a request for the sidelink synchronization source to which the terminal device is synchronized.

Example 35. The method of example 33, further including: transmitting, to a location management entity, a mapping between the sidelink synchronization source and a network device serving the terminal device.

Example 36. The method of example 33, further including: providing, to a location management entity, a synchronization offset between the terminal device and another terminal device, wherein the synchronization offset is used to determine the position of the target terminal device.

Example 37. The method of example 33, further including: transmitting, to a location management entity, a mapping between an identifier of the sidelink synchronization source and a network device serving the terminal device.

Example 38. The method of example 37, wherein the mapping is used to determine by the location management entity the position of the target terminal device.

Example 39. A method of determining a position of a target terminal device, the method including performing by a location management entity (LMF), steps may include: receiving (step 510), from a plurality of supporting terminal devices (S_UE), information indicative of corresponding sidelink synchronization sources (gNB) to which each of the plurality of supporting terminal devices is synchronized; and supporting positioning determination (step 518) of a target terminal device (T_UE) using the indicated information.

Example 40. The method of example 39, further including: acquiring synchronization offsets among the plurality of supporting terminal devices.

Example 41. The method of example 40, further including: determining a position of the target terminal device based on the synchronization offsets among the plurality of supporting terminal devices.

Example 42. The method of example 40, further including: providing, to the target terminal device, the synchronization offsets among the plurality of supporting terminal devices, wherein the synchronization offsets among the plurality of supporting terminal devices are used to determine a position of the target terminal device.

Example 43. A terminal device including: means for receiving, from a plurality of supporting terminal devices, information indicative of corresponding sidelink synchronization sources to which each of the plurality of supporting terminal devices is synchronized; and means for obtaining, a position of the terminal device, which is based on the indicated information of the corresponding sidelink synchronization sources.

Example 44. The terminal device of example 43, wherein the position of the terminal device is determined based on synchronization offsets among the plurality of supporting terminal devices.

Example 45. The terminal device of example 43 or 44, wherein the receiving of the information is responsive to a request by the terminal device, for the corresponding sidelink synchronization sources to which each of the plurality of supporting terminal devices is synchronized.

Example 46. The terminal device of any preceding examples 43-45, further including: means for performing respective measurements on one or more sidelink position reference signals from the plurality of supporting terminal devices.

Example 47. The terminal device of example 46, wherein the measurements are sidelink reference signal time difference (SL RSTD) measurements.

Example 48. The terminal device of any preceding examples 44-47, further including: means for receiving, from a network entity, the synchronization offsets among the plurality of supporting terminal devices; and means for determining the position of the terminal device based on the measurements and the synchronization offsets among the plurality of supporting terminal devices.

Example 49. The terminal device of example 48, further including: means for correcting the measurements using the synchronization offsets among the plurality of supporting terminal devices; and means for determining the position of the terminal device using the corrected measurements.

Example 50. The terminal device of example 46, further including: means for transmitting, to a network entity, a measurement report including the measurements by the terminal device.

Example 51. The terminal device of example 50, wherein the measurement report indicates the corresponding sidelink synchronization sources to which each of the plurality of supporting terminal devices is synchronized.

Example 52. The terminal device of example 50, further including: means for transmitting, to the network entity, an indication indicative of the corresponding sidelink synchronization sources to which each of the plurality of supporting terminal devices is synchronized.

Example 53. The terminal device of example 51 or 52, wherein the measurements by the terminal device are corrected by the network entity using the synchronization offsets among the plurality of supporting terminal devices, and the position of the terminal device is determined by the network entity using the corrected measurements.

Example 54. A terminal device including: means for indicating, to a target terminal device of a sidelink synchronization source to which the terminal device is synchronized; and means for transmitting, to the target terminal device, a sidelink position reference signal to enable a determination of a position of the target terminal device, which is based on the sidelink position reference signal and the sidelink synchronization source.

Example 55. The terminal device of example 54, further including: means for receiving, from the target terminal device, a request for the sidelink synchronization source to which the terminal device is synchronized.

Example 56. The terminal device of example 54, further including: means for transmitting, to a location management entity, a mapping between the sidelink synchronization source and a network device serving the terminal device.

Example 57. The terminal device of example 54, further including: means for providing, to a location management entity, a synchronization offset between the terminal device and another terminal device, wherein the synchronization offset is used to determine the position of the target terminal device.

Example 58. The terminal device of example 54, further including: means for transmitting, to a location management entity, a mapping between an identifier of the sidelink synchronization source and a network device serving the terminal device.

Example 59. The terminal device of example 58, wherein the mapping is used to determine by the location management entity the position of the target terminal device.

Example 60. A location management entity including: means for receiving, from a plurality of supporting terminal devices, information indicative of corresponding sidelink synchronization sources to which each of the plurality of supporting terminal devices is synchronized; and means for supporting positioning determination of a target terminal device using the indicated information.

Example 61. The location management entity of example 60, further including: means for acquiring synchronization offsets among the plurality of supporting terminal devices.

Example 62. The location management entity of example 61, further including: means for determining a position of the target terminal device based on the synchronization offsets among the plurality of supporting terminal devices.

Example 63. The location management entity of example 61, further including: means for providing, to the target terminal device, the synchronization offsets among the plurality of supporting terminal devices, wherein the synchronization offsets among the plurality of supporting terminal devices are used to determine a position of the target terminal device.

References to a 'computer', 'processor', etc. should be understood to encompass not only computers having different architectures such as single/multi-processor architectures and sequential or parallel architectures but also specialized circuits such as field-programmable gate arrays (FPGAs), application specific circuits (ASICs), signal processing devices and other processing circuitry. References to computer program, instructions, code etc. should be understood to encompass software for a programmable processor or firmware such as, for example, the programmable content of a hardware device whether instructions for a processor, or configuration settings for a fixed-function device, gate array or programmable logic device etc.

The memory(ies) as described herein may be implemented using any suitable data storage technology, such as semiconductor based memory devices, flash memory, magnetic memory devices and systems, optical memory devices and systems, non-transitory memory, transitory memory, fixed memory and removable memory. The memory(ies) may comprise a database for storing data.

As used herein, the term 'circuitry' may refer to the following: (a) hardware circuit implementations, such as implementations in analog and/or digital circuitry, and (b) combinations of circuits and software (and/or firmware), such as (as applicable): (i) a combination of processor(s) or (ii) portions of processor(s)/software including digital signal processor(s), software, and memory(ies) that work together to cause an apparatus to perform various functions, and (c) circuits, such as a microprocessor(s) or a portion of a microprocessor(s), that require software or firmware for operation, even if the software or firmware is not physically present. As a further example, as used herein, the term ‘circuitry’ would also cover an implementation of merely a processor (or multiple processors) or a portion of a processor and its (or their) accompanying software and/or firmware. The term ‘circuitry’ would also cover, for example and if applicable to the particular element, a baseband integrated circuit or applications processor integrated circuit for a mobile phone or a similar integrated circuit in a server, a cellular network device, or another network device.

In the figures, arrows between individual blocks represent operational couplings there-between as well as the direction of data flows on those couplings.

It should be understood that the foregoing description is only illustrative. Various alternatives and modifications may be devised by those skilled in the art. For example, features recited in the various dependent claims could be combined with each other in any suitable combination(s). In addition, features from different example embodiments described above could be selectively combined into a new example embodiment. Accordingly, this description is intended to embrace all such alternatives, modifications and variances which fall within the scope of the appended claims.

The following acronyms and abbreviations that may be found in the specification and/or the drawing figures are defined as follows (the abbreviations and acronyms may be appended with each other or with other characters using e.g. a dash or hyphen):

| | |
|---|---|
| 3GPP | third generation partnership project |
| 4G | fourth generation |
| 5G | fifth generation |
| 5GC | 5G core network |
| AMF | access and mobility management function |
| AoA | angle of arrival, or azimuth of arrival |
| AOA/D | angle of arrival or departure, or azimuth of arrival or departure |
| AoD | angle of departure, or azimuth of departure |
| ASIC | application-specific integrated circuit |
| CPU | central processing unit |
| CU | central unit or centralized unit |
| DL | downlink |
| DL-TDOA | downlink time difference of arrival |
| DSP | digital signal processor |
| eNB | evolved Node B (e.g., an LTE base station) |
| EN-DC | E-UTRAN new radio - dual connectivity |
| en-gNB | node providing NR user plane and control plane protocol terminations towards the UE, and acting as a secondary node in EN-DC |
| E-UTRA | evolved universal terrestrial radio access, i.e., the LTE radio access technology |
| E-UTRAN | E-UTRA network |
| F1 | interface between the CU and the DU |
| FPGA | field-programmable gate array |
| gNB | base station for 5G/NR, i.e., a node providing NR user plane and control plane protocol terminations towards the UE, and connected via the NG interface to the 5GC |
| GNSS | global navigation satellite system |
| IAB | integrated access and backhaul |
| ID | identifier |
| I/F | interface |
| IIOT | industrial internet of things |
| I/O | input/output |
| ITS | Intelligent Transport Systems |
| LMF | location management function |
| LPP | LTE positioning protocol |
| LTE | long term evolution (4G) |
| MAC | medium access control |
| MME | mobility management entity |
| MRO | mobility robustness optimization |
| NCE | network control element |
| ng or NG | new generation |
| ng-eNB | new generation eNB |
| NG-RAN | new generation radio access network |
| NR | new radio (5G) |

-continued

| | |
|---|---|
| N/W | network |
| OTA | over the air |
| PBCH | physical broadcast channel |
| PCI | physical cell ID |
| PDA | personal digital assistant |
| PDCP | packet data convergence protocol |
| PHY | physical layer |
| PRS | positioning reference signal |
| RAM | random access memory |
| RAN | radio access network |
| RAT | radio access technology |
| Rel- | release |
| RLC | radio link control |
| ROM | read-only memory |
| RRC | radio resource control (protocol) |
| RSRP | reference signal receive power |
| RSRPP | reference signal received path power |
| RSTD | reference signal time difference |
| RSU | road side unit |
| RTD | relative time difference |
| RTT | round trip time |
| RU | radio unit |
| Rx | receiver or reception |
| SGW | serving gateway |
| SID | study item description |
| SL | sidelink |
| SLSS | sidelink synchronization signal |
| SMF | session management function |
| SON | self-organizing/optimizing network |
| SS | synchronization signal |
| SSB | synchronization signal block |
| S-UE or S_UE | supporting UE |
| TDOA | time difference of arrival |
| TR | technical report |
| TRP | transmission reception point |
| TS | technical specification |
| T-UE or T_UE | target UE |
| Tx | transmitter or transmission |
| UAV | unmanned aerial vehicle |
| UE | user equipment (e.g., a wireless, typically mobile device) |
| UL | uplink |
| UPF | user plane function |
| Uu | interface for cellular communication between a device and base station (e.g. an air interface) |
| V2X | vehicle to everything |
| X2 | network interface between RAN nodes and between RAN and the core network |
| Xn | network interface between NG-RAN nodes |
| ZoA | zenith of arrival |
| ZoD | zenith of departure |

The invention claimed is:

1. A terminal device for communication, comprising at least one processor; and at least one memory including computer program code; wherein the at least one memory and the computer program code are configured to, with the at least one processor, cause the terminal device at least to:

receive, from a plurality of supporting terminal devices, information indicative of corresponding sidelink synchronization sources to which each of the plurality of supporting terminal devices is synchronized;

obtain, a position of the terminal device, which is based on the indicated information of the corresponding sidelink synchronization sources, wherein the position of the terminal device is determined based on synchronization offsets among the plurality of supporting terminal devices;

receive, from a network entity, the synchronization offsets among the plurality of supporting terminal devices; and determine the position of the terminal device based on the measurements and the synchronization offsets mapping among the plurality of supporting terminal devices.

2. The terminal device of claim 1, wherein the receiving of the information is responsive to a request by the terminal device, for the corresponding sidelink synchronization sources to which each of the plurality of supporting terminal devices is synchronized.

3. The terminal device of claim 1, wherein the terminal device is further configured to:

perform respective measurements, on one or more sidelink position reference signals from the plurality of supporting terminal devices.

4. The terminal device of claim 3, wherein the measurements are sidelink reference signal time difference (SL RSTD) measurements.

5. The terminal device of claim 1, wherein the terminal device is further configured to:

correct, the measurements using the synchronization offsets among the plurality of supporting terminal devices; and determine the position of the terminal device using the corrected measurements.

6. The terminal device of claim 1, wherein the terminal device is further configured to perform one or more of:

transmit to a network entity, a measurement report comprising the measurements by the terminal device; or transmit to the network entity, an indication indicative of the corresponding sidelink synchronization sources to which each of the plurality of supporting terminal devices is synchronized.

7. The terminal device of claim 6, wherein one or more of the following is applicable:

the measurement report indicates the corresponding sidelink synchronization sources to which each of the plurality of supporting terminal devices is synchronized; or the measurements by the terminal device are corrected by the network entity using the synchronization offsets among the plurality of supporting terminal devices, and the position of the terminal device is determined by the network entity using the corrected measurements.

8. A terminal device for communication, comprising at least one processor; and at least one memory including computer program code; wherein the at least one memory and the computer program code are configured to, with the at least one processor, cause the terminal device at least to:

indicate, to a target terminal device of a sidelink synchronization source to which the terminal device is synchronized;

transmit, to the target terminal device, a sidelink position reference signal to enable a determination of a position of the target terminal device, which is based on the sidelink position reference signal and the sidelink synchronization source; and provide, to a location management entity, a synchronization offset between the terminal device and another terminal device, wherein the position of the target terminal device is determined based on provided by the location management entity, synchronization offsets mapping among the plurality of supporting terminal devices.

9. The terminal device of claim 8, wherein the terminal device is further configured to perform one or more of:

receive, from the target terminal device, a request for the sidelink synchronization source to which the terminal device is synchronized.

10. The terminal device of claim 8, wherein the terminal device is further configured to:

transmit, to a location management entity, a mapping between the sidelink synchronization source and a network device serving the terminal device.

11. The terminal device of claim 8, wherein the terminal device is further configured to:

transmit, to a location management entity, a mapping between an identifier of the sidelink synchronization source and a network device serving the terminal device.

12. The terminal device of claim 8, wherein a mapping is used to determine by the location management entity the position of the target terminal device.

13. A location management entity for communication, comprising at least one processor; and at least one memory including computer program code; wherein the at least one memory and the computer program code are configured to, with the at least one processor, cause the location management entity at least to:

receive, from a plurality of supporting terminal devices, information indicative of corresponding sidelink synchronization sources to which each of the plurality of supporting terminal devices is synchronized;

support positioning determination of a target terminal device using the indicated information;

acquire synchronization offsets from among the plurality of supporting terminal devices; and provide, to the target terminal device, the synchronization offsets among the plurality of supporting terminal devices, wherein the synchronization offsets among the plurality of supporting terminal devices are used to determine a position of the target terminal device.

14. The location management entity of claim 13, wherein the location management entity is further configured to perform one or both of:

determine a position of the target terminal device based on the synchronization offsets among the plurality of supporting terminal devices; or provide, to the target terminal device, the synchronization offsets among the plurality of supporting terminal devices, wherein the synchronization offsets among the plurality of supporting terminal devices are used to determine a position of the target terminal device.

* * * * *